United States Patent [19]

Inaba et al.

[11] Patent Number: 4,479,673
[45] Date of Patent: Oct. 30, 1984

[54] HAND OF AN INDUSTRIAL ROBOT

[75] Inventors: Hajimu Inaba; Seiichiro Nakajima, both of Hino; Shinsuke Sakakibara, Kunitachi; Ryo Nihei, Musashino, all of Japan

[73] Assignee: Fujitsu Fanuc Limited, Hino, Japan

[21] Appl. No.: 387,855

[22] PCT Filed: Sep. 30, 1981

[86] PCT No.: PCT/JP81/00259
§ 371 Date: Jun. 1, 1982
§ 102(e) Date: Jun. 1, 1982

[87] PCT Pub. No.: WO82/01152
PCT Pub. Date: Apr. 15, 1982

[30] Foreign Application Priority Data

Sep. 30, 1980 [JP] Japan ............................. 55-135258

[51] Int. Cl.³ .............................................. B25J 15/00
[52] U.S. Cl. ........................................ 294/88; 269/34; 269/118; 269/155; 294/86 R; 901/37; 901/39
[58] Field of Search ................ 294/34, 67 BB, 86 R, 294/87 R, 88, 103 R, 113; 269/32-34, 109, 111, 118, 119, 152, 153, 155, 218; 414/618, 621, 729, 730, 736, 741, 744 A, 751; 901/31, 37, 39

[56] References Cited

U.S. PATENT DOCUMENTS 4,252,496 2/1981 Williams ..................... 294/113 X
4,273,506 6/1981 Thomson et al. ............ 294/88 X

FOREIGN PATENT DOCUMENTS 50-23191 8/1975 Japan.
50-101282 8/1975 Japan.
52-147379 8/1977 Japan.
54-45071 4/1979 Japan.
0131255 10/1979 Japan ................................ 294/88

Primary Examiner—Johnny D. Cherry
Attorney, Agent, or Firm—Armstrong, Nikaido, Marmelstein & Kobovcik

[57] ABSTRACT

A hand (34) of an industrial robot for gripping a workpiece (14) and the like comprising: a hand base plate member (36) connected to a wrist portion (32); a plurality of pairs of opening and closing gripping fingers (38a and 38b, 38d) arranged on the palm face (36a) of the hand base plate member (36), and; an actuator (48 or 48') being arranged for each pair of the opening and closing fingers (38a and 38b, 38c and 38d) to actuate the fingers. The hand (34) is capable of securely and stably holding a workpiece having a heavy weight and/or an angular shape, or other complicated shape.

3 Claims, 6 Drawing Figures

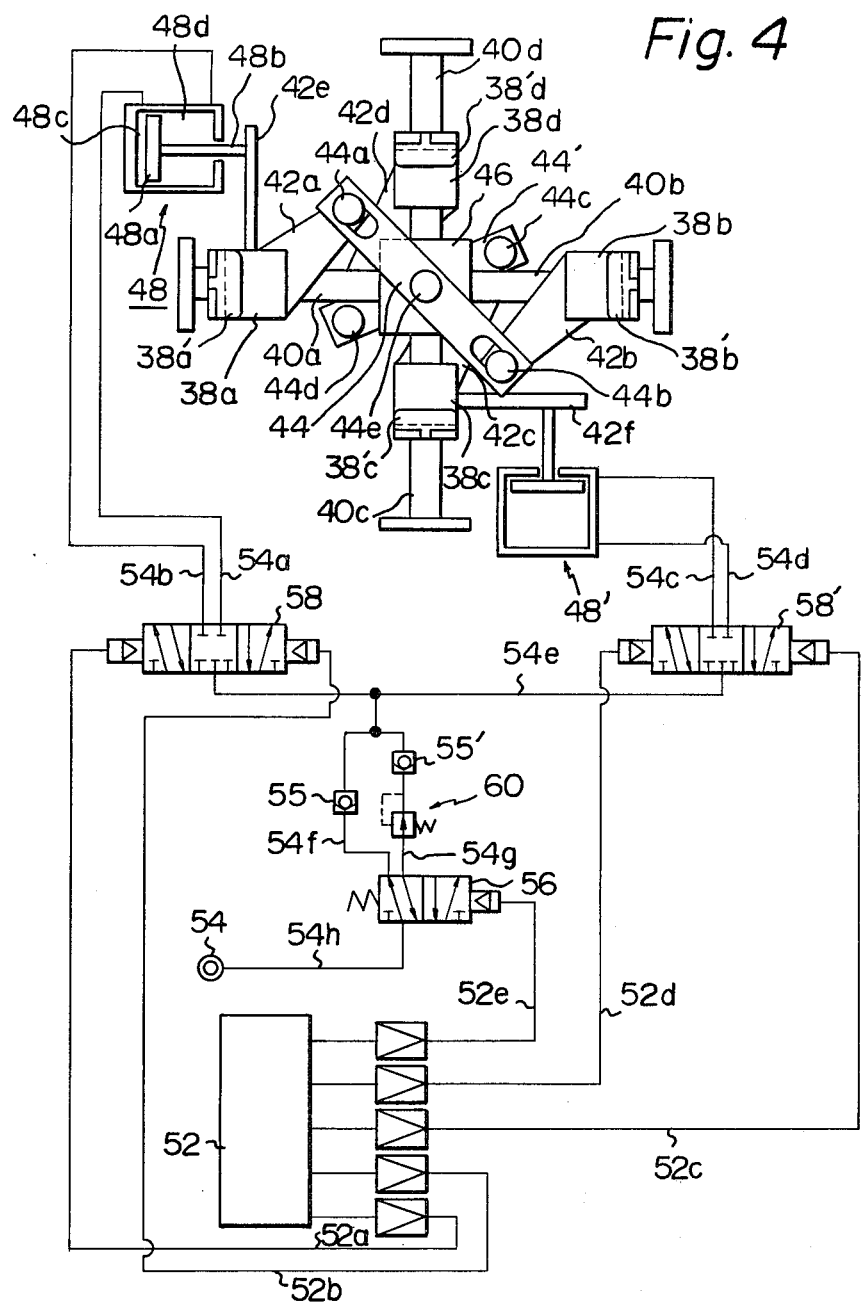

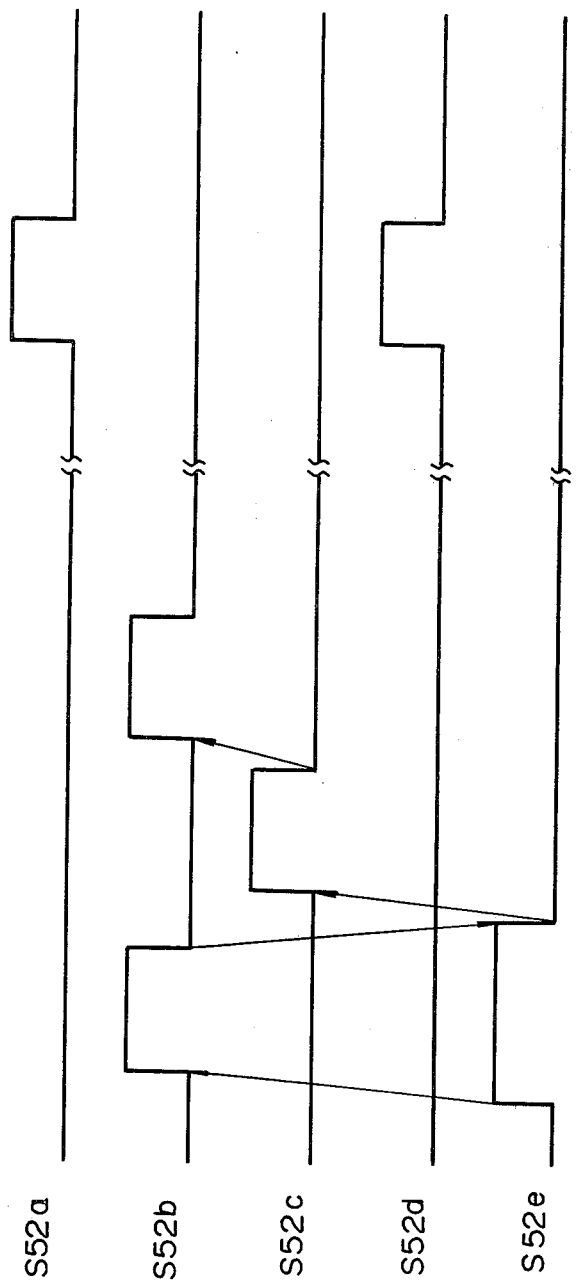

HAND OF AN INDUSTRIAL ROBOT

DESCRIPTION

Title of the Invention
Hand of an Industrial Robot

1. Technicial Field

The present invention relates to an industrial robot. More particularly, the present invention relates to an improvement of the structure of a gripping finger of a hand of an industrial robot for increasing the gripping function of the hand.

2. Background Art

Industrial robots are now used widely in various fields for holding and delivering articles having a heavy weight or holding and delivering workpieces of machine tools. In the field where articles having a heavy weight are held and delivered, the application range of an industrial robot is especially broadened, and the weight of articles to be gripped (hereinafter referred to as "workpieces") is increasing and the shape of workpieces is diversified, causing the holding and delivering to become complicated. Accordingly, industrial robots able to accomplish holding and delivering heavy workpieces of diversified shapes greatly contribute to enhancing the labor-saving effect. When a workpiece having an increased weight is gripped and delivered by conventional robots, a robot hand, for example, the robot hand 10 shown in FIG. 1, effects the gripping and delivering operation. More specifically, in FIG. 1, the robot hand 10 has gripping fingers 12 and 12' opening and closing in the direction indicated by an arrow A, that is, in the lateral direction, and the hand 10 is brought close to a workpiece 14 in the lateral direction, that is, in the direction indicated by an arrow B, and the gripping fingers 12 and 12' are closed to grip the workpiece 14 therebetween. According to this gripping method, however, since the workpiece is gripped only at two confronting positions on the side face of the workpiece, the gripping state often becomes unstable when the weight of the workpiece is very heavy and/or when the workpiece has an angular plane shape, though the method is suitable for gripping and delivering a workpiece having a circular plane shape or a relatively light weight. When a workpiece having an angular shape is gripped, the gripping state is biased with respect to the gripping fingers, and, therefore, gripping is very unstable and there is the risk that an accident may occur. Furthermore, in the case where the position of a workpiece is lower than the position of the robot, for example, when the workpiece is placed on the floor surface of a workshop, because of structural limitations of the conventional robot, it is very difficult for said conventional robot to grip such workpiece and, in some cases, gripping is impossible. In order to eliminate this disadvantage, it is necessary to provide a special configuration or structure for a robot arm or wrist portion.

DISCLOSURE OF THE INVENTION

It is a primary object of the present invention to eliminate the above-mentioned defect of the conventional robot hand and provide a hand of an industrial robot having a structure capable of securely and stably holding, by at least four confronting fingers, a workpiece having a heavy weight and/or an angular shape, or other complicated shape.

In accordance with the present invention, there is provided a hand of an industrial robot for gripping an article to be gripped, such as a workpiece, said hand comprising a hand base plate member connected to a wrist portion and a plurality of pairs of opening and closing gripping fingers arranged on the palm face of the hand base plate member, with an actuator being arranged for each pair of the opening and closing gripping fingers to actuate said fingers.

BRIEF EXPLANATION OF THE DRAWINGS

FIG. 4 is a diagram illustrating an example of the structure of an apparatus for operating the hand shown in FIG. 3.

FIG. 6 is a time chart of signals emitted from the control apparatus when gripping fingers are opened and closed.

BEST MODE FOR CARRYING OUT THE INVENTION

The present invention will now be described in detail with reference to embodiments illustrated in FIGS. 2 through 5 of the accompanying drawings.

Figure 2:
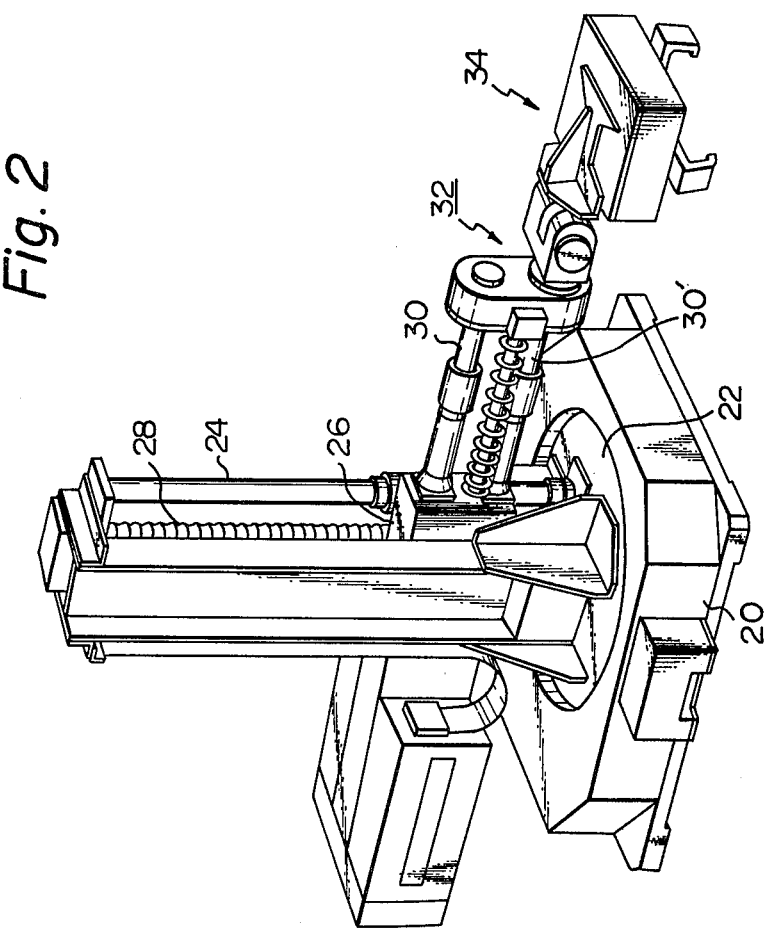
FIG. 2 is a perspective view showing the appearance of an industrial robot provided with a robot hand according to one embodiment of the present invention.

FIG. 2 is a perspective view showing the appearance of an industrial robot provided with one embodiment of the industrial robot hand according to the present invention.

In FIG. 2, reference numeral 20 represents a stationary base of an industrial robot, and a turntable 22 is arranged on this stationary base 20 so that the turntable 22 can rotate in both the normal and reverse directions. Two vertical guide shafts 24 and 24' are mounted on the turntable 22 to support a robot casing 26 movable in the vertical direction. Guide shaft 24' is not visible because it is hidden by the vertical support member. A vertical feed screw shaft 28 is arranged parallel to the vertical guide shafts 24 and 24' and is threadedly engaged with the robot casing 26, so that the robot casing 26 is vertically moved along the guide shafts 24 and 24' according to the rotation of the vertical feed screw shafts 28. The robot casing 26 supports robot arms 30 and 30' so that the robot arms 30 and 30' are extended and contracted in the axial direction, and a robot hand 34, according to the present invention, is attached to the ends of the robot arms 30 and 30' through a wrist mechanism portion 32. The hand 34 is arranged so that the rotating position and swinging position of the hand 34 can be determined by the operation of the wrist mechanism portion 32.

Figure 1:
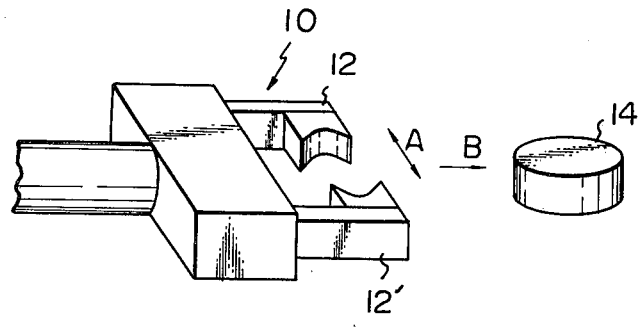
FIG. 1 is a diagram illustrating a conventional robot hand.
Figure 3:
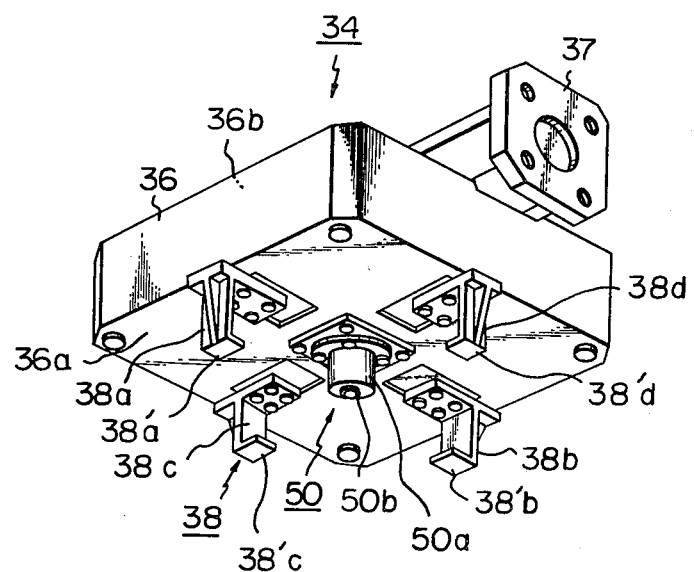
FIG. 3 is a perspective view showing the appearance of the hand shown in FIG. 2.

FIG. 3 is a perspective view showing the appearance of a hand 34 according to one embodiment of the present invention. In FIG. 3, reference numeral 34 represents the hand as a whole. In the present specification, the lower face of a hand base plate member 36, that is, the face gripping a workpiece, is called a "palm face" 36a, and the opposite face is called "back face" 36b. Gripping fingers 38 are arranged so that they extend in the direction perpendicular to the palm face 36a of the base plate member 36 of the hand 34, and the gripping fingers 38 consist of two pairs of fingers, that is, fingers 38a and 38b and fingers 38c and 38d. The first pair of the gripping fingers 38a and 38b are arranged symmetrically with each other with respect to the center of the palm face 36a to confront each other, and these fingers 38a and 38b are constructed so that they move toward the center of the palm face 36a parallel to the palm face 36a synchronously with each other to effect the opening and closing operation and, thereby, come to hold a workpiece. The second pair of fingers 38c and 38d are constructed and arranged in the same manner as the first pair of fingers 38a and 38b, except that the opening and closing direction of the fingers 38c and 38d intersects the opening and closing direction fo the fingers 38a and 38b at a right angle. In the interior of the hand base plate member 36, a mechanism for opening an closing these fingers, such as a link mechanism, as shown in FIG. 4, an air cylinder or a changeover solenoid valve, is arranged for each pair of the gripping fingers, so that the respective pairs of the gripping fingers are opened an closed synchronously or independently. Inwardly bent hook claws 38'a, 38'b, 38'c and 38'd are mounted on the top ends of the gripping fingers 38, respectively, and a gripped workpiece is anchored by these hook claws to prevent the workpiece from falling. Accordingly, even a workpiece having a heavy weight can be securely held and delivered safely. In FIG. 3, a pressing device 50 is disposed in the central portion of the palm face 36a, and this pressing device 50 comprises a fixing portion 50a and a pressing finger 50b. In the interior of fixing portion 50a, an actuator, for example, a fluid cylinder (not shown), is arranged in such a manner that it is connected to the pressing finger 50b to actuate the pressing finger 50b vertically. When the gripping fingers 38a, 38b, 38c and 38d grip a workpiece, the pressing finger 50b is appropriately actuated to press the workpiece so that the workpiece is securely anchored by the hook claws 38'a, 38'b, 38'c and 38'd, but not held in the biased state. An attachment bracket 37 is mounted on the back face 36b of the hand base plate member 36, and the attachment bracket 37 is formed so that it can be attached to the wrist mechanism portion 32, as shown in FIG. 2.

FIG. 4 shows an example of the structure of an apparatus for operating the hand 34. Referring to FIG. 4, the first pair of the fingers 38a and 38b are slidably connected to guide shafts 40a and 40b secured to a stationary bracket 46 through gripping finger supporting brackets 42a and 42b, respectively. The top end portions of the supporting brackets 42a and 42b are slidably and rotatably connected to both the ends of a link 44 through pins 44a and 44b. The central portion of the link 44 is supported on the stationary bracket 46 through a pin 44e so that the link 44 can turn. An operating portion of the actuator, for example, a piston rod 48b of an air cylinder 48, is connected to the end portion of an operating bracket 48e secured to the base end of one 42a of the supporting brackets 42a and 42b. Accordingly, with the reciprocative movement of the piston 48a of the air cylinder 48, the gripping fingers 38a and 38b are moved, parallel with each other, along the guide shafts 40a and 40b through the above-mentioned link mechanism, so that the fingers 38a and 38b confront each other and effect the opening and closing operation. The second pair of the gripping fingers 38c and 38d are arranged so that the opening and closing direction of the fingers 38c and 38d intersects the opening the closing direction of the fingers 38a and 38b at a right angle. The gripping fingers 38c and 38d are opened and closed along guide shafts 40c and 40d by the air cylinder 48' through a link mechanism having the same structure as that of the link mechanism for the first pair of the gripping fingers 38a and 38b, which is arranged on the opposite side of the stationary bracket 46 and comprises guide shafts 40c and 40d, gripping finger supporting brackets 42c and 42d, an operating bracket 42f, pins 44c, 44d and 44e and a link 44'. Reference numeral 52 represents a robot control apparatus 52, and each of reference numerals 52a, 52b, 52c, 52d and 52e represents an electric signal line. Reference numeral 54 represents a compressed air source and each of reference numerals 54a, 54b, 54c, 54d, 54e, 54f, 54g and 54h represents an air passage. Each of reference numerals 56, 58 and 58' represents a changeover solenoid valve for controlling the direction of the air passage, and these changeover solenoid valves perform a changeover operation based on electric signals from the robot control apparatus 52. More specifically, referring to FIG. 4, by the changeover operation of the changeover solenoid valve 56, the passage 54h is connected to one of the passages 54f or 54g. In this case, compressed air (hereinafter referred to as "air") flowing in the passage 54f passes through a check valve 55 and flows in the passage 54e with the same air pressure as the air pressure at the air source 54. On the other hand, the pressure of air flowing in the passage 54g is reduced to a predetermined level by a pressure reducing valve 60, and this air passes through a check valve 55' and flows into the passage 54e. By controlling the air pressure in two stages, in the manner described above, the driving forces of the cylinders 48 and 48' are controlled at two levels, one strong and one weak, and, therefore, the gripping force of the hand can be controlled at two levels, one strong and one weak. Namely, the gripping force of the hand can appropriately be selected according to the weight of a workpiece, and a high air pressure or a low pressure is appropriately chosen, whereby wasteful consumption of air can be avoided and air can be used at high efficiency. In this embodiment, the air pressure is controlled at two levels. Of course, however, if the number of related members, such as pressure reducing valves, is increased, an air pressure control apparatus, capable of multi-staged air pressure control, can be constructed. The changeover solenoid valves 58 and 58' have the same structure. For example, the passage 54e is selectively connected to the passage 54a or 54b, and, by this changeover operations, air is introduced alternately into cylinder chambers 48c and 48d of the cylinder 48 to move the piston 48a reciprocatively. Of course, there may be adopted a modification in which, when the solenoid valve 58 is set at the neutral position, the passage 54e is shut to intercept the air flowing into the passage 54a or 54b. If both the changeover solenoid valves 58 and 58' are simultaneously set at the neutral positions, or if one or the other of these valves 58 and 58' is set at the neutral position, the first pair of the gripping fingers 38a and 38b and the second pair of the gripping fingers 38c and 38d can be opened and closed synchronously or independently. Incidentally, the pressing device 50, shown in FIG. 3, is not shown in FIG. 4. However, the pressing device can also be easily constructed and assembled in FIG. 4 by appropriately arranging related members, such as changeover solenoid valves and air cylinders.

Figure 5:
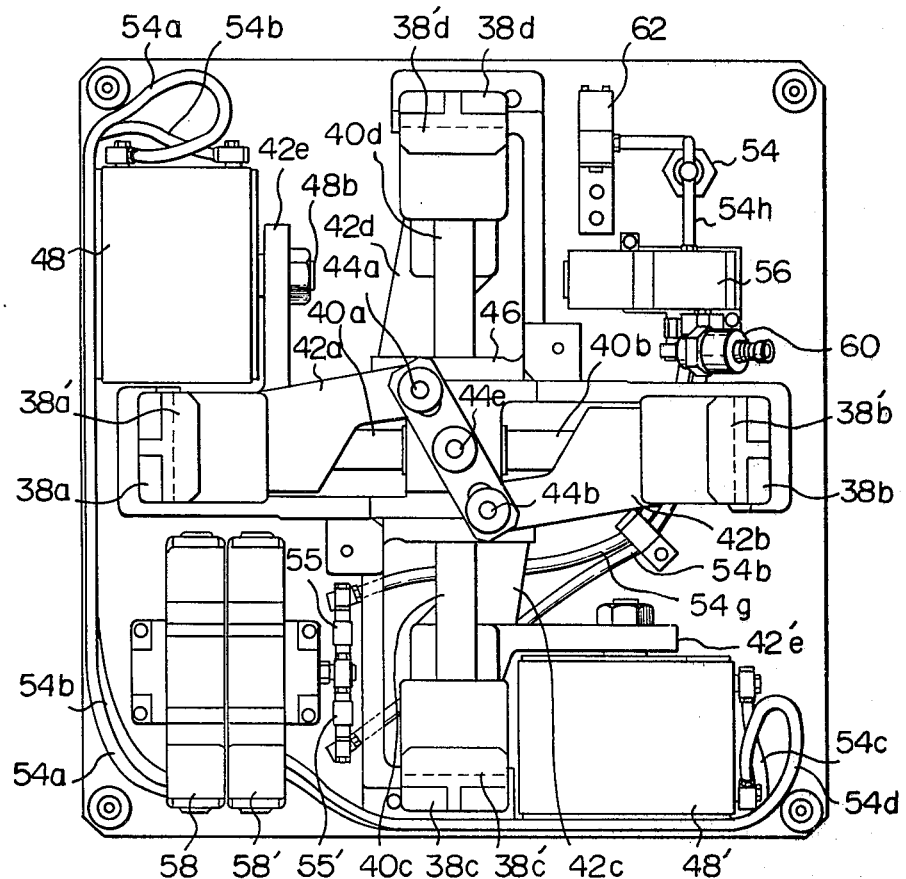
FIG. 5 is a front view of the hand seen from the side of the palm face, which illustrates an example of the arrangement of the respective members shown in FIG. 4.

FIG. 5 is a front view of the hand seen from the side of the palm face, which illustrates an embodiment of the arrangement of the respective members shown in FIG. 4. Reference numerals in FIG. 5 represent the same members as in FIG. 4. Incidentally, reference numeral 62 in FIG. 5 represents a changeover solenoid valve 62 for the pressing device (50 in FIG. 3).

A preferred embodiment of the operation of the industrial robot hand of the present invention will now be described with reference to FIG. 4 and the time chart of FIG. 6.

When a workpiece is gripped by the gripping fingers 38a, 38b, 38c and 38d shown in FIG. 4, in order to hold the workpiece correctly so that the center of the workpiece coincides with the gripping center of the hand, the workpiece is gripped by the other pair of the gripping fingers 38c and 38d with a strong gripping force, while a weak gripping force is maintained in one pair of the gripping fingers 38a and 38b, and then, the gripping force of the fingers 38a and 38b is changed over to a strong gripping force. If the gripping fingers are operated according to this sequence, the operation of making the center of the workpiece coincide with the gripping center of the hand can be performed more assuredly than in the case where two pairs of the gripping fingers are simultaneously operated.

FIG. 6 is a time chart of electric signals S52a, S52b, S52c, S52d and S52e transmitted from the robot control apparatus 52 through the signal lines 52a, 52b, 52c, 52d and 52e, respectively. When a workpiece is held, at first, the signal S52e on the signal line 52e, shown in FIG. 4, is maintained at a high level according to instruction data given and stored, in advance, in the robot control apparatus 52 and, then, the signal S52b on the signal line 52b is maintained at a high level, whereby the gripping fingers 38a and 38b are caused to grip the workpiece with a weak gripping force. Then, by the control apparatus 52, the signal S52e on the signal line 52e is maintained at a low level and the signal S52c on the signal line 52c is maintained at a high level, whereby the gripping fingers 38c and 38d are caused to grip the workpiece with a strong gripping force. At this time, even if the center of the workpiece is deviated from the moving direction of the gripping fingers 38c and 38d since the gripping force of the gripping fingers 38c and 38d is larger than the gripping force of the gripping fingers 38a and 38b, the center of the workpiece can be made to coincide with the gripping center of the hand. In the where the centr of the workpiece coincides with the gripping center of the hand, the signal S52b on the signal line 52b is maintained at a high level by the control apparatus 52, whereby the gripping force of the gripping fingers 38a and 38b is changed over to a strong gripping force. Then, the operation of shifting the workpiece to be instructed position is performed, and the signals on the signal lines 52a and 52d are maintained at a high level by the control apparatus 52, with the result that the fingers 38a, 38b, 38c and 38d simultaneously perform an opening operation under a strong air pressure to release the workpiece at the instructed position.

We claim:

1. A hand of an industrial robot for gripping a workpiece of irregular shape, comprising:
    a hand base connected to a movable wrist portion of said robot, said hand base having a plate member serving as a palm face;
    two pairs of gripping fingers movably mounted on said plate member extending perpendicular to said palm face, said fingers of each pair being arranged symmetrically with each other with respect to the center of said palm face, each pair of said gripping fingers being independently slidably movable toward each other to close and grip said workpiece and away from each other to open and release said workpiece, the opening and closing direction of one pair of said gripping fingers intersecting the opening and closing direction of the other pair of said gripping fingers at a right angle; and
    a pair of independently operated fluid cylinders mounted on said hand base and having pistons therein arranged for reciprocative movement, the piston of each cylinder being connected to impart sliding movement to a respective one of each pair of gripping fingers, said one finger of each pair being connected to the other finger of that pair by a pivoting link mechanism to move simultaneously therewith so that each pair of gripping fingers is independently moved by its respective fluid cylinder.

2. A hand of an industrial robot as claimed in claim 1 wherein each of said gripping fingers comprises a hook claw at its end projecting toward the center of said palm face, and said hand further comprises a workpiece pressing means arranged in the central portion of said palm face for pressing on said workpiece so that said workpiece is securely anchored by said hook claws when said gripping fingers are closed.

3. A hand of an industrial robot as claimd in claim 1 wherein each of said gripping fingers is slidably mounted on a guide shaft secured to a stationary bracket on said hand base, and each pair of said gripping fingers is connected through a link that is centrally pivoted on said stationary bracket and slidably and rotatably connected to said gripping fingers to cause them to move parallel with each other.

* * * * *